United States Patent [19]

Terai et al.

[11] Patent Number: 4,991,551
[45] Date of Patent: Feb. 12, 1991

[54] APPARATUS FOR PREVENTING REVERSE ROTATION OF AN ENGINE

[75] Inventors: Masahiro Terai; Yasuyo Hisano; Katsuhiro Eda; Kazuto Shimada, all of Tokyo, Japan

[73] Assignee: Fuji Jukogyo Kabushiki Kaisha, Tokyo, Japan

[21] Appl. No.: 414,206

[22] Filed: Sep. 28, 1989

[30] Foreign Application Priority Data

Oct. 7, 1988 [JP] Japan .................. 63-253260

[51] Int. Cl.⁵ .................................... F01L 13/08
[52] U.S. Cl. ........................ 123/198 D; 123/90.1; 123/182
[58] Field of Search ............... 123/182, 90.16, 198 D, 123/198 F, 90.1

[56] References Cited

U.S. PATENT DOCUMENTS

| | | | |
|---|---|---|---|
| 2,620,203 | 11/1971 | Harkness | 123/182 |
| 3,314,408 | 4/1967 | Fenton | 123/182 |
| 3,850,155 | 11/1974 | Thomas | 123/198 D |
| 4,672,930 | 6/1987 | Sumi | 123/90.16 |

Primary Examiner—Andrew M. Dolinar
Attorney, Agent, or Firm—Beveridge, DeGrandi & Weilacher

[57] ABSTRACT

An engine reverse rotation prevention apparatus provided in an engine having valve opening and closing means which is in slidable contact with a cam provided on a camshaft. The valve opening and closing means is interconnected with a valve. The engine reverse rotation prevention apparatus comprises a release cam of a reverse rotation prevention release lever supported on the camshaft, which is in contact with a cam base of a cam provided on the camshaft. The release cam is provided with a cam lobe that protrudes from the profile of the cam base and rotates in the opposite direction to that of the camshaft when the engine rotates in a reverse direction. Thus, the reverse rotation of the engine is prevented.

2 Claims, 4 Drawing Sheets

APPARATUS FOR PREVENTING REVERSE ROTATION OF AN ENGINE

BACKGROUND OF THE INVENTION

The present invention relates to an apparatus for preventing reverse rotation of an engine, particularly to the apparatus for stopping the engine by escaping compression pressure when its rotation reverses upon starting.

When a diesel engine having a high compression ratio, it is hard to crank manually to exceed a top dead center, so that reverse rotation may occur because of ignition prior to reaching the top dead center, and consequently the engine will continue to rotate in the reverse direction.

Various apparatus for preventing the reverse rotation of the engine have been proposed to stop an engine when it continues to rotate in the reverse direction because of this.

For example, in Japanese Utility Model Laid-Open Publication No. 176452/1980 is disclosed an apparatus for preventing reverse rotation of an engine wherein, in an engine which is rotating in reverse, a cam protrudes due to the centrifugal force produced by that rotation and a cam follower interconnected with this cam operates a fuel pump control rack to forcedly move the fuel pump to a fuel cut position.

However, in such an apparatus for preventing reverse rotation of an engine of the prior art, the cam that protrudes due to centrifugal force is used to perform the cutting-off of the fuel, and so when the engine is stopped from reverse rotation, the speed of the engine drops. The centrifugal force becomes progressively weaker, and the abovementioned cam no longer protrudes and as a consequence, the fuel is no longer cut off. Therefore, the engine starts to rotate in reverse once again from a slow speed.

Moreover, it is also necessary to separately provide a link mechanism to interconnect the cam follower and the control rack of the fuel pump. This makes the structure more complex and also complicates the assembly procedure, and increases the product cost as a consequence.

SUMMARY OF THE INVENTION

An object of the present invention is to provide an apparatus for preventing reverse rotation of an engine that has a simplified structure, that is easily assembled, that has a reduced product cost, and that can definitely stop the engine when it rotates in reverse In an engine where valve opening and closing means is provided on a camshaft, a release cam is provided for engaging with a cam base of the cam formed on the camshaft. Moreover, the release cam is provided with a cam lobe that protrudes from the cam base and rotates in the direction opposite to the direction of rotation of the camshaft when the camshaft rotates in reverse direction when there is reverse rotation of an engine.

When there is reverse rotation of an engine provided with a configuration such as this, the cam lobe provided on the release cam of the reverse rotation prevention release lever axially supported on the camshaft protrudes from the cam base of the cam provided on the camshaft, and forcedly lifts up the valve.

When the valves are opened, the compression pressure is reduced and the engine comes to a stop.

DETAILED DESCRIPTION OF THE PREFERRED EMBODIMENT

Figure 1:
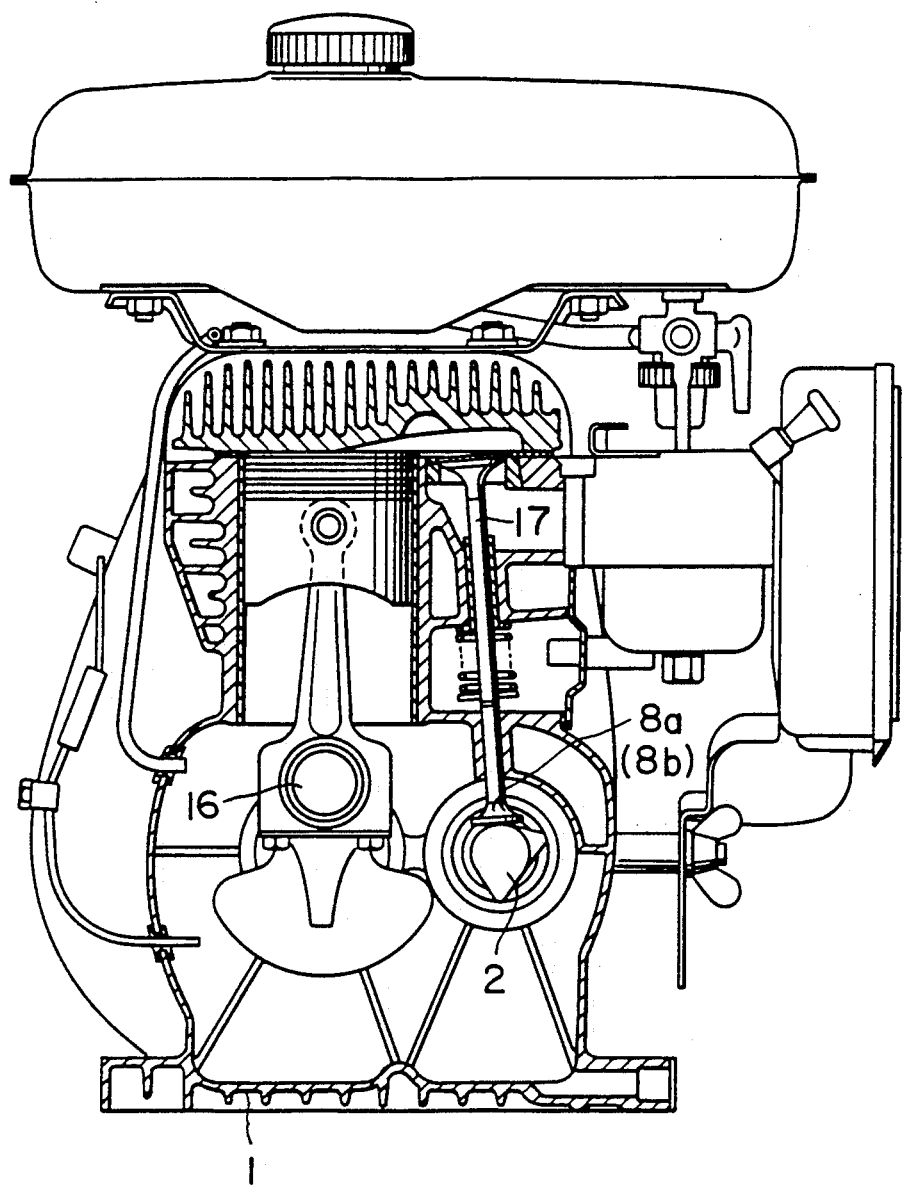
FIG. 1 is a schematic view of an engine.
Figure 6:
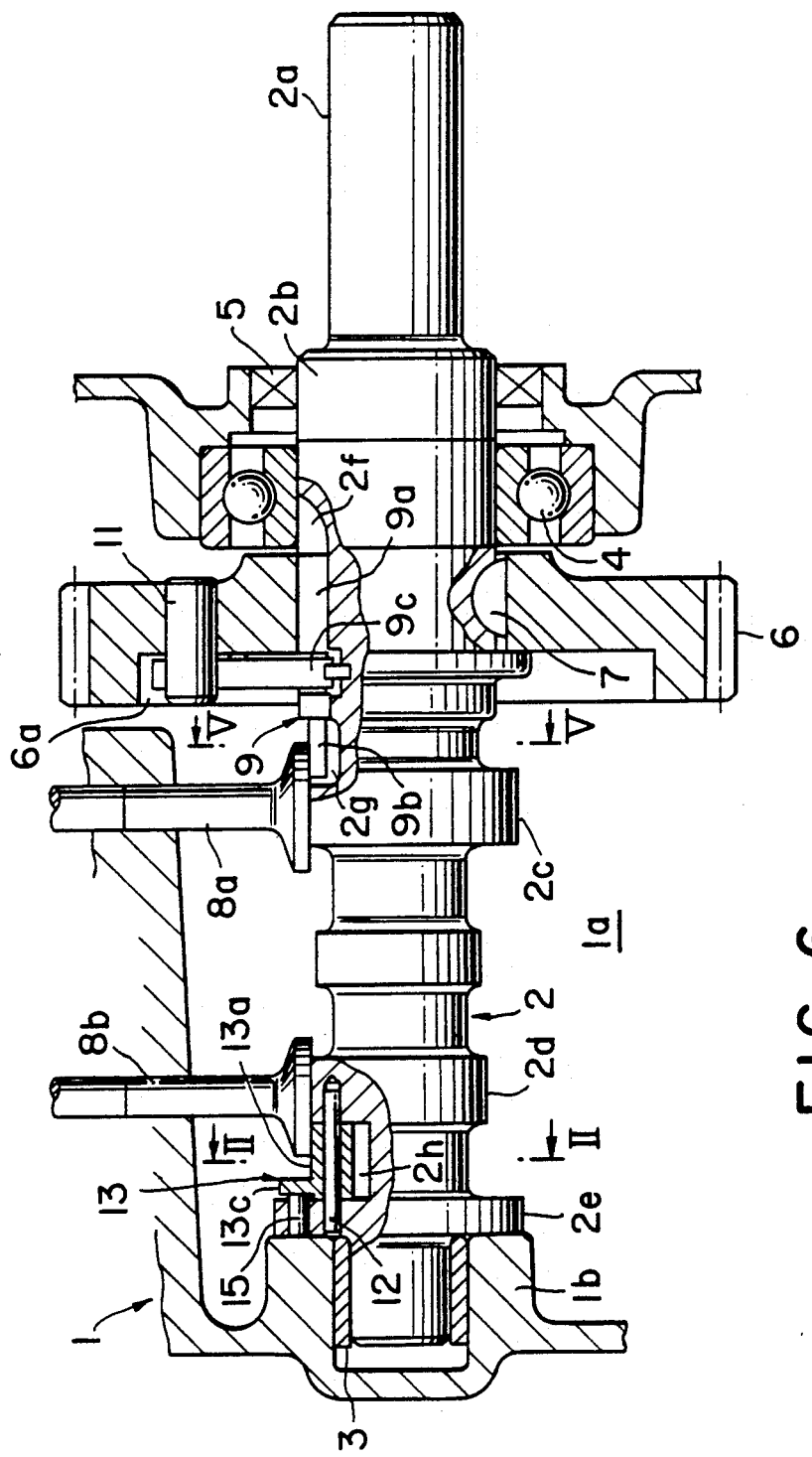
FIG. 6 is a partial sectional view of a camshaft of an embodiment of the apparatus for preventing reverse rotation of the engine according to the present invention.

The numeral 1 in FIGS. 1 and 6 indicates a crankcase, and an upper portion of a crank chamber 1a of the crankcase 1 is provided with a camshaft 2 disposed sideways and parallel to a crankshaft 16, with an end of the camshaft 2 being supported by a bush 3 inserted into cam bearing 1b formed in the crankcase 1.

Another end of an output shaft 2a integrally formed at another end of the camshaft 2 protrudes from the crankcase 1 and a journal 2b formed at a base of this other end is supported in the crankcase 1 by a bearing 4 which is secured by a seal 5.

Also, a connecting portion of the journal 2b of the camshaft 2 has a cam-driven gear 6 fixed on its axis by a key 7 and in engagement with a cam drive gear provided on the crankshaft 16.

Moreover, the camshaft 2 has an intake cam 2d and a flange 2e which is in slidable contact with an end surface of the cam bearing 1b and is integrally formed with predetermined intervals of an exhaust cam 2c from the side of the cam-driven gear 6 to the side of the cam bearing 1b.

Furthermore, the exhaust cam 2c and the intake cam 2d of the camshaft 2 are in slidable contact with an exhaust tappet 8a and an intake tappet 8b respectively and the tappets 8a and 8b are respectively linked to an exhaust valve (not shown in the figure) and an intake valve 17.

Still furthermore, a groove 2f is formed in a position on shaft portion of the camshaft 2 axially supporting the cam-driven gear 6, and which is facing the side of the exhaust tappet 8a. A shaft portion 9a of a decompression release lever 9 is axially supported by the groove 2f through a bush (not shown in the figure) and so as to be freely rotatable.

A release lever 9 has the shaft portion 9a, a decompression cam 9b integrally formed at a front end of the shaft portion 9a and a flyweight 9c. The axis of rotation is the same as that of the decompression cam 9b and the flyweight 9c is housed in a recess 6a formed in a side surface of said cam-driven gear 6.

Still furthermore, the decompression cam 9b of the decompression release lever 9 protrudes into a flat step portion 2g formed on a side surface of the exhaust cam 2c of the camshaft 2, and a cam lobe 9d protrudes a predetermined height from a cam base 9e of the exhaust cam 2c.

Yet furthermore, when the flyweight 9c is in the closed position, the cam lobe 9d of the decompression cam 9b is in slidable contact with the exhaust tappet 8a and when the flyweight 9c is the open position the cam base 9e of the decompression cam 9b is in alignment with the exhaust tappet 8a.

Moreover, the closing angle of the flyweight 9c is regulated by a stopper 10 protruding from the flat step portion of the camshaft 2, and the opening angle of the flyweight 9c is regulated by a stopper pin 11 inserted into the side face of the cam-driven gear 6. (See FIG. 4 and FIG. 5).

Moreover, when the exhaust tappet 8a is being forcedly lifted up by the decompression cam 9b, the compression pressure is reduced and the ignition temperature does not rise. Ignition is therefore not possible. The engine speed N1 to cancel the decompression operation is set by the weight of the flyweight 9c, or setting the urging force of the return spring where a return spring is mounted. However, a lower engine speed than a predetermined value is normally set in dependency on comfortness of the starting procedure and the cranking speed.

Moreover, a groove 2h is formed a groove 2h in the position corresponding to the intake tappet 8b between the intake cam 2d of the camshaft 2 and flange 2e which is at the compression stroke for the reverse rotation. A pin 12 is supported by the intake cam 2d and the flange 2e at an upper portion of the groove 2h. The pin 12 is inserted into a shaft portion 13a of a release lever 13 for preventing reverse rotation so as to be freely rotatable.

Also, a release cam 13b is formed at the shaft portion 13a of the release lever 13 and a flyweight 13c is formed at an end of the release cam 13b (the side of flange 2e of camshaft 2 in the figure). A stopper 13d is integrally formed at a position on an opposite side of the flyweight 13c.

Figure 3:
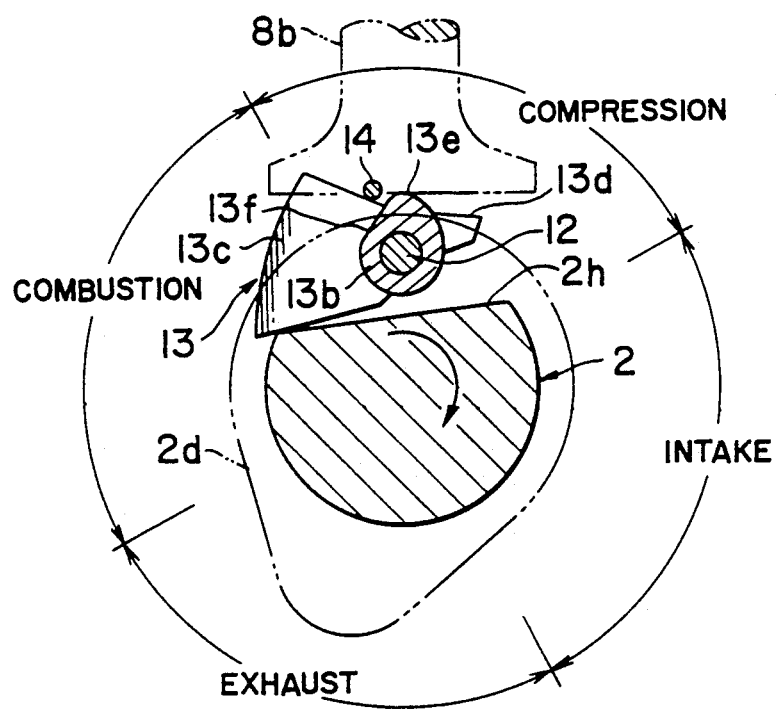
FIG. 3 is another sectional view of an embodiment of an apparatus for preventing reverse rotation of an engine according to the present invention.

Furthermore, an end of a return spring 14 is inserted into the shaft portion 13a, and the end is secured to the flyweight 13c. Another end of the return spring 14 is secured to a pin 15 inserted into the flange 2e of the camshaft 2, and the release lever 13 is urged by the return spring 14 anticlockwise as shown in FIG. 3.

Figure 2:
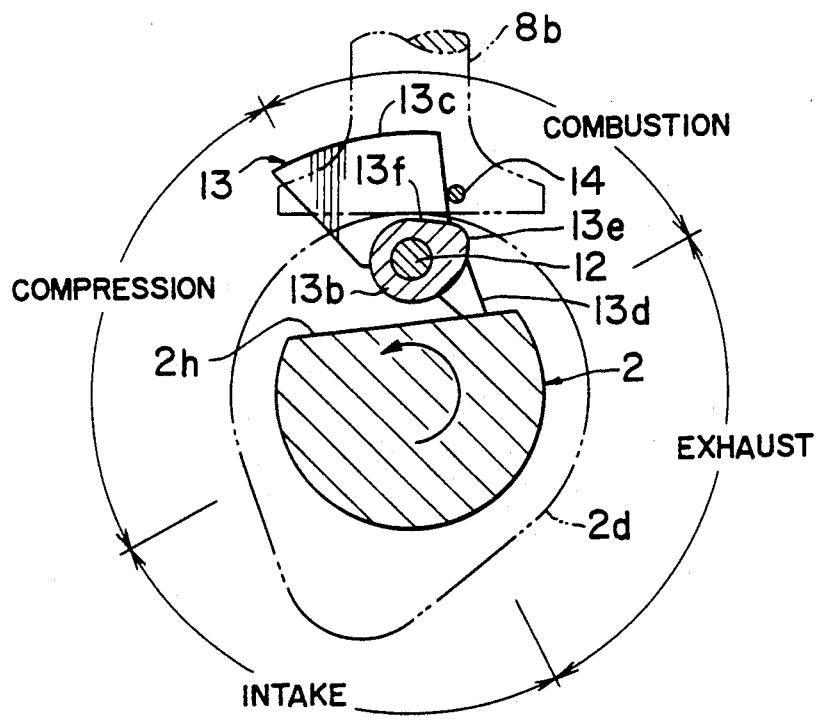
FIG. 2 is a sectional view along the section lines II—II of FIG. 6, of an embodiment of an apparatus for preventing reverse rotation of an engine according to the present invention.

Normally, the camshaft 2 rotates in the anticlockwise direction as shown in FIG. 2. And so when the release lever 13 rotates in the same direction as that of the camshaft 2, an end of the release lever 13 is in contact with the groove 2h of the camshaft 2, and a closing angle of the flyweight 13c is limited. (See FIG. 3.)

However, when the release lever 13 rotates in the clockwise direction, the stopper 13d provided on the release lever 13 comes into contact with the groove 2h and an opening angle of the flyweight 13c is limited. (See FIG. 2.)

Also, when the flyweight 13c is in the closed position, a cam lobe 13e of the release cam 13b protrudes from the profile of the cam base of the intake cam 2d of the camshaft 2, and lifts up the intake tappet 8b. However, when the flyweight 13c is in the opened position, the cam base 13f of the release cam 13b lowers within the profile of the intake cam 2d and the intake tappet 8b is no longer lifted up.

The following will describe the operation of the embodiment of the present invention described above.

When the engine is stopped, the flyweight 13c of the release lever 13 receives the urging force of the return spring 14 and is placed in the closed position, and the cam lobe 13e of the release cam 13b provided on the release lever 13 protrudes a predetermined height from the profile of the cam base of the intake cam 2d provided on the camshaft 2. Also, when the flyweight 9c of the decompression release lever 9 receives the urging force of a return spring (not shown in the figures), and is closed, the cam lobe 9d of the decompression cam 9b provided on the decompression release lever 9, protrudes a predetermined height from the profile of a cam base of exhaust cam 2c provided on the camshaft 2.

Figure 4:
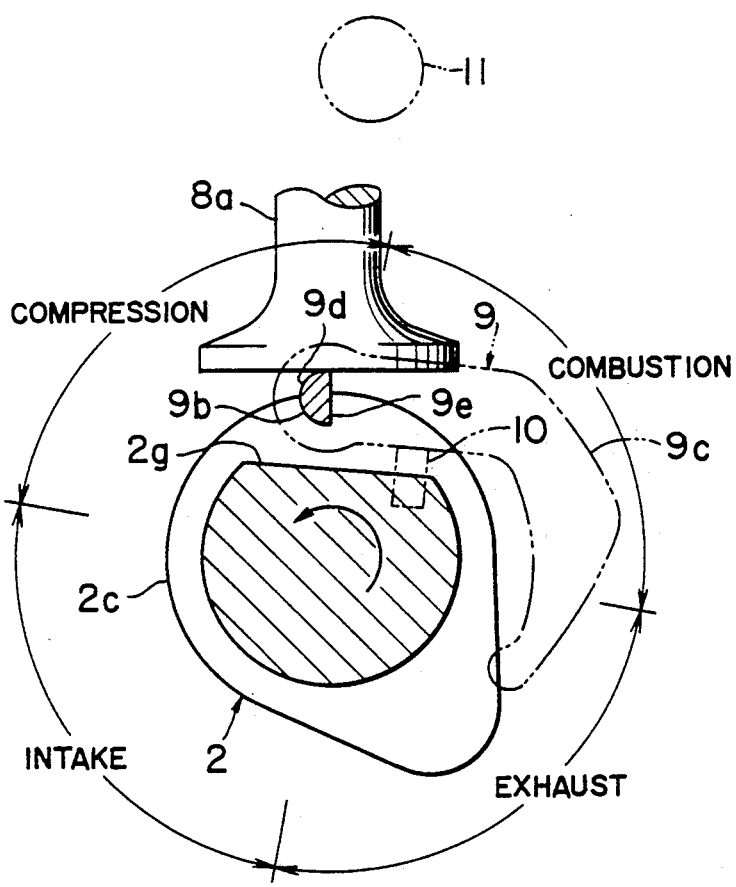
FIG. 4 is another sectional view of an embodiment of an apparatus for preventing reverse rotation of an engine according to the present invention.

Then, when the engine is manually cranked, the camshaft 2 rotates in the anticlockwise direction as shown in FIG. 2 and FIG. 4. The cam lobe 13e of the release lever 13 receives the pushing pressure of the intake tappet 8b and rotates in the clockwise direction as shown in FIG. 3. This cam lobe 13e withdraws within the profile of the cam base of intake cam 2d provided on the camshaft 2.

Accordingly, the intake tappet 8b is not lifted up when the engine is cranked.

However, when the engine speed is low at cranking, the centrifugal force acting upon the flyweight 9c of the decompression release lever 9 is weak and the frictional force of the exhaust tappet 8a causes the cam lobe 9d of the decompression cam 9b provided on the decompression release lever 9 to receive an urging force in the clockwise direction as shown in FIG. 4. Thus, the flyweight 9c engages the stopper 10 and its rotation is stopped.

When this occurs, the cam lobe 9d of the decompression cam 9b of the decompression release lever 9 forcedly lifts up the exhaust tappet 8a at the compression stroke, the exhaust valve linked to the exhaust tappet 8a is half opened and the compression pressure is reduced (See FIG. 4.)

As a result, the load on the worker or the load to starter motor is reduced and the cranking operation is facilitated.

When the engine speed has gradually increased while it is being cranked, the centrifugal force acting upon the flyweight 9c of the decompression release lever 9 becomes stronger and the flyweight 9c opens so that the cam lobe 9d of the decompression cam 9b is embedded in the cam base of the exhaust cam 2c when the engine speed reaches a predetermined speed N1. Thus the decompression is automatically cancelled.

When this occurs, the compression pressure of the engine rises and the compression heat reaches the ignition temperature and the engine starts.

Figure 5:
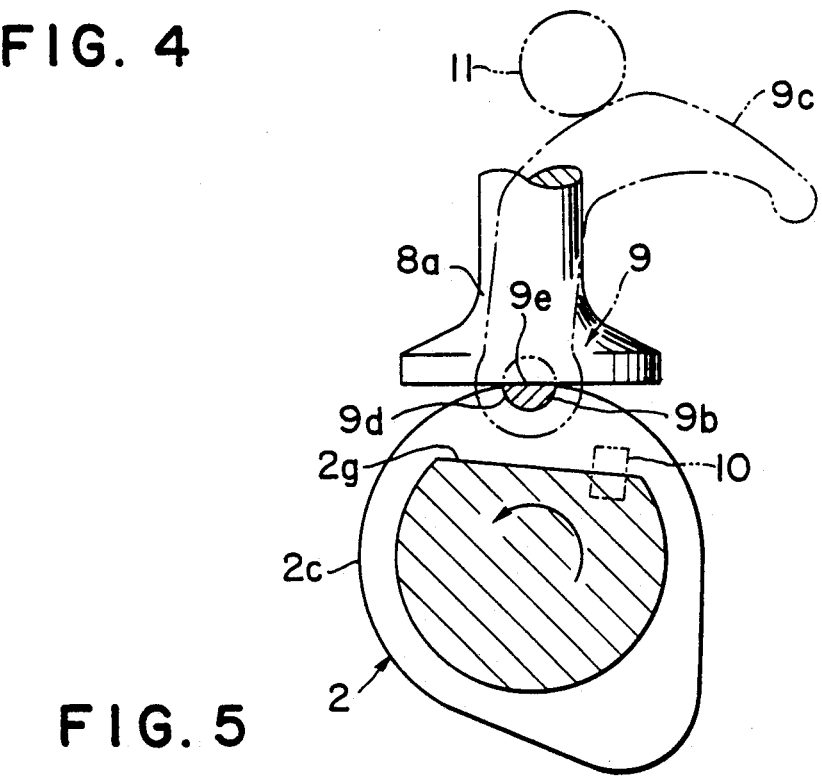
FIG. 5 is a sectional view along the section lines V—V of FIG. 6, of an embodiment of the apparatus for preventing reverse rotation of an engine according to the present invention.

During this time, the flyweight 9c of the decompression release lever 9 is stopped by the stopper pin 11 and the flyweight 9c is held in the open position (See FIG. 5.)

However, when the cranking finishes and the engine speed has risen, the centrifugal force acting upon the flyweight 13c of the release lever 13 becomes gradually stronger and when the engine speed reaches a predetermined engine speed N2, the urging force of the return spring 14 is overcome and the flyweight 13c opens. The front end of the stopper 13d is stopped in the groove 2h of the camshaft 2 and the opening position of the flyweight 13c is maintained (See FIG. 2.)

When the flyweight 13c opens, the predetermined engine speed N2 is set at a higher value than the engine speed N1 at which the flyweight 9c of the decompression release lever 9 opens and the value is lower than the engine idling speed $N_{ID}$ (i.e $N1 < N2 \leq N_{ID}$).

If during cranking, the pulling force on the recoil starter rope is not sufficient, so that the piston can pass the top dead center, then the piston will receive a reaction compression force and will be pushed down to cause the engine to rotate in reverse.

If, as shown in FIG. 3, the engine rotates in reverse (shown as clockwise in the figure) due to self ignition, then the engine cycle will turn in the reverse direction of the normal rotational direction, and air induced from the exhaust port will be discharged from the intake port.

A comparison of the cycles between the normal rotation and the reverse operation is as follows.

Normal rotation intake→compression→combustion→exhaust

Reverse rotation: exhaust→combustion→compression→intake

When the engine rotates in reverse, the cam lobe 9d provided on the decompression cam 9b of the decompression release lever 9 is pressed down by the exhaust tappet 8a and is reversed. Thus decompression does not occur.

However, when reverse rotation begins, the flyweight 13c of the release cam 13b provided on the release lever 13 receives the urging force of the return spring 14 and is stopped at the open position in the direction of rotation (the anticlockwise direction in FIG. 3) opposite to the direction of (the reverse) rotation of the camshaft 2. Therefore, the intake tappet 8b rides the cam lobe 13e of the release cam 13b provided on the release lever 13 is forcedly lifted up and the intake valve pushed by the intake tappet 8b is opened in the compression cycle.

As a result, the compression pressure is reduced, the engine stops immediately because the ignition temperature is not reached, and the reverse rotation is automatically prevented.

Moreover, the present invention is not limited to the embodiment described above as for example, it is possible to use only the apparatus of the present invention on an engine which is not fitted with a starter decompression device, and the valve opening and closing mechanism is not limited to a tappet since it could also be a rocker arm or a valve stem.

Furthermore, both the release lever for preventing reverse rotation and the decompression release lever for preventing reverse rotation can be provided to lift up the one valve.

As described above, in the engine wherein valve opening and closing means is in sliding contact with a cam provided on the camshaft, and the valve opening and closing means is interconnected to the valve, and the release cam of the release lever for preventing reverse rotation axially supported by the camshaft is in contact with the cam base of the cam provided on the camshaft. Furthermore, the release cam is provided with the cam lobe that protrudes from the profile of the cam base and rotates in the direction opposite to the direction of rotation of the camshaft when the camshaft rotates in reverse. Therefore, when the reverse rotation occurs, the valve opening and closing means is forcedly lifted up and the compression pressure is automatically reduced so that the engine soon comes to a stop.

Moreover, the valve opening and closing means interconnected with the valve is forcedly lifted up and the pressure reduced so that it is not necessary to have a complex interconnection mechanism. The structure of the engine can therefore be simplified, its maintenability is improved, the manufacturing and assembly processes facilitated, and significant reductions in the manufacturing cost are obtained.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An apparatus for preventing reverse rotation of an engine having an intake valve for inducing air/fuel mixture into a cylinder of said engine, an exhaust valve for discharging exhaust gas from said cylinder, a cam shaft driven by a crank shaft through gears, and the apparatus having valve actuating means engaged with a cam formed on said cam shaft, an improvement of the apparatus which comprises:
   a release lever mounted on a groove of said cam shaft for releasing said intake valve when said crank shaft rotates in a reverse direction;
   a cam lobe formed on said release lever to actuate said valve actuating means;
   a stopper provided on said release lever to contact said groove when said crank shaft rotates in a right direction;
   a weight connected to said release lever to turn said release lever by centrifugal force thereof without releasing said intake valve and for abutting said stopper to said groove when said crank shaft rotates in said right direction; and
   elastic means for urging said weight to resist said centrifugal force and for lifting said valve actuating means to open said intake valve so as to stop said engine when said crank shaft rotates in said reverse direction.

2. The apparatus according to claim 1, further comprising:
   a flange integrally formed on said cam shaft adjacent said cam to define said groove between said cam and said flange; and
   a pin supported by said cam and said flange at an upper portion of said groove and inserted into said release lever to mount thereof.

* * * * *